(12) United States Patent
Palusa et al.

(10) Patent No.: US 8,804,889 B2
(45) Date of Patent: Aug. 12, 2014

(54) RECEIVER WITH DUAL CLOCK RECOVERY CIRCUITS

(71) Applicant: LSI Corporation, Milpitas, CA (US)

(72) Inventors: Chaitanya Palusa, Fremont, CA (US); Tomasz Prokop, Pleasanton, CA (US)

(73) Assignee: LSI Corporation, Milpitas, CA (US)

( * ) Notice: Subject to any disclaimer, the term of this patent is extended or adjusted under 35 U.S.C. 154(b) by 30 days.

(21) Appl. No.: 13/738,185

(22) Filed: Jan. 10, 2013

(65) Prior Publication Data

US 2014/0192935 A1 Jul. 10, 2014

(51) Int. Cl.
 *H04L 7/00* (2006.01)
 *H04L 27/38* (2006.01)
 *H04L 27/06* (2006.01)
 *H03D 3/24* (2006.01)

(52) U.S. Cl.
 CPC .................................. *H04L 7/0087* (2013.01)
 USPC ............ 375/355; 375/316; 375/340; 375/376

(58) Field of Classification Search
 CPC ....... H04L 7/033; H04L 1/205; H04L 7/0331; H04L 7/0334; H03L 7/091; H03L 7/0814; H03L 7/0807; H03L 2207/50; H03L 2207/06; G11C 7/222; H04J 3/0685
 USPC ......... 375/316, 340, 354, 355, 371, 373, 376; 327/58, 62, 77, 78, 79, 91, 141, 144, 327/147, 155, 156
 See application file for complete search history.

(56) References Cited

U.S. PATENT DOCUMENTS

| 6,307,906 | B1 * | 10/2001 | Tanji et al. ..................... 375/376 |
| 7,053,719 | B2 | 5/2006 | Steinbach et al. |
| 7,592,847 | B2 | 9/2009 | Liu et al. |
| 7,676,014 | B2 | 3/2010 | Chen et al. |
| 8,027,409 | B2 * | 9/2011 | Aziz et al. ...................... 375/316 |
| 2004/0114702 | A1 | 6/2004 | Friedman et al. |
| 2006/0083339 | A1 * | 4/2006 | Aziz et al. ...................... 375/355 |
| 2007/0075785 | A1 | 4/2007 | Kossel et al. |
| 2007/0140379 | A1 | 6/2007 | Iorga |
| 2008/0061851 | A1 | 3/2008 | Jeon |
| 2010/0135378 | A1 * | 6/2010 | Lin et al. ........................ 375/233 |
| 2012/0109356 | A1 * | 5/2012 | Kong et al. .................... 700/121 |
| 2013/0009679 | A1 | 1/2013 | Sindalovsky |
| 2013/0195234 | A1 * | 8/2013 | Lee et al. ....................... 375/355 |
| 2014/0064744 | A1 * | 3/2014 | Yoshiyama et al. .......... 398/202 |

OTHER PUBLICATIONS

Kurt H. Mueller and Markus Muller; Timing Recovery in Digital Synchronous Data Receivers; IEEE Transactions on Communications, May 1976.

Joon-Yeong Lee and Hyeon-Min Bae; Application of Kalman Gain for Minimum Mean-Squared Phase-Error Bound in Bang-Bang CDRs; IEEE Transactions on Circuits and Systems—I: Regular Papers, vol. 59, No. 12, Dec. 2012.

J.D.H. Alexander; Clock Recovery from Random Binary Signals; Electronic Letters; Oct. 30, 1975, vol. 11, No. 22; University of Aberdeen; Aberdeen Scotland.

* cited by examiner

*Primary Examiner* — Tesfaldet Bocure

(57) ABSTRACT

A receiver derives the desired data sampling clock phase by averaging the phase information of transitions before and after a data eye. The average of the phase information reduces data clock phase error due to variations in the phases of transitions in received data signals depending on the polarity and positions of the transitions.

20 Claims, 6 Drawing Sheets

| CDR 156: v(k-1)<br>CDR 158: v(k-2) | CDR 156: v(k-1/2)<br>CDR 158: v(k-3/2) | CDR 156: v(k)<br>CDR 158: v(k-1) | PDOUT |
|---|---|---|---|
| 0 | 0 | 0 | 0 (NO DATA TRANSITION) |
| 0 | 0 | 1 | -1 |
| 0 | 1 | 0 | 0 |
| 0 | 1 | 1 | 1 |
| 1 | 0 | 0 | 1 |
| 1 | 0 | 1 | 0 |
| 1 | 1 | 0 | -1 |
| 1 | 1 | 1 | 0 (NO DATA TRANSITION) |

RECEIVER WITH DUAL CLOCK RECOVERY CIRCUITS

FIELD OF THE INVENTION

The present invention relates to receivers generally and, more specifically, to clock recovery circuitry in receivers therein.

BACKGROUND

Communication receivers that recover digital signals must sample an analog waveform and then reliably detect the sampled data. Signals arriving at a receiver are typically corrupted by intersymbol interference (ISI), crosstalk, echo, and other noise. As data rates increase, the receiver must both equalize the channel, to compensate for such corruptions, and detect the encoded signals at increasingly higher clock rates. Decision-feedback equalization (DFE) is a widely used technique for removing intersymbol interference and other noise at high data rates.

Generally, decision-feedback equalization utilizes a non-linear equalizer to equalize the channel using a feedback loop based on previously recovered (or decided) data. In one typical DFE-based receiver implementation, a received analog signal is sampled in response to a data-sampling clock after DFE correction and compared to one or more thresholds to generate the recovered data.

To acquire the correct clock phase and properly sample incoming data signals in the center of the data "eye" opening, a clock and data recovery (CDR) circuit derives the correct clock phase by "locking" onto transitions in the incoming data signals. However, because of linear and non-linear distortions in the receiver, transmitter, or channel circuitry, the transitions might vary in phase with respect to the center of the eye depending upon the transition polarity (e.g., positive going or negative going). By relying on a single transition per clock eye for recovering clock phase might result in the introduction of considerable error in the data-sampling clock phase and lead to errors by the receiver.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment of the invention, a method of generating clock signals in a receiver is described. A first clock and data recovery circuit generates a first clock signal phase-aligned with transitions temporally after a data eye in data signals applied to an input of the receiver, and generates a first phase value indicating a phase difference between the first clock signal and a reference clock signal. A second clock and data recovery circuit generates a second clock signal phase-aligned with transitions temporally before the data eye in the data signals, and generates a second phase value indicating a phase difference between the second clock signal and the reference clock signal. A circuit calculates an average of the first phase value and the second phase value to form an average phase value. A data sampling clock signal is generated from the reference clock signal, data sampling clock signal being phase shifted from the reference clock signal by an amount determined by the average phase value. Then the data signals are sliced using a slicer clocked by the data sampling clock.

BRIEF DESCRIPTION OF THE DRAWINGS

Other embodiments of the present invention will become more fully apparent from the following detailed description, the appended claims, and the accompanying drawings in which like reference numerals identify similar or identical elements.

FIG. 4 is a table illustrating operation of a bang-bang phase detector in the CDR of FIG. 3;

DETAILED DESCRIPTION

Figure 1:
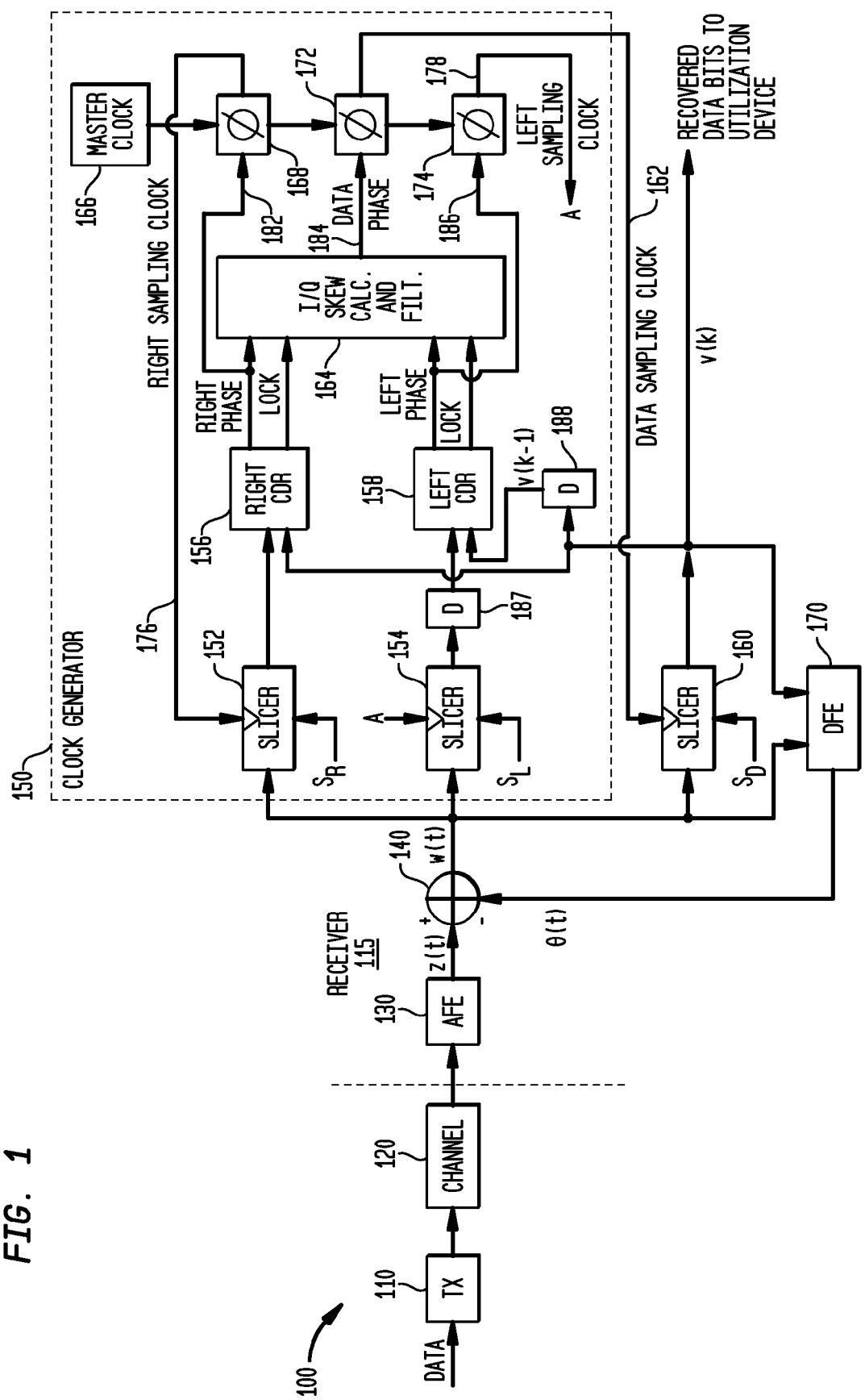
FIG. 1 is a simplified block diagram of a serializer/deserializer (SERDES) communication channel having a receiver incorporating a clock generator according to one embodiment of the invention.

In addition to the patents referred to herein, each of the following patents and patent applications are incorporated herein in their entirety:

U.S. Pat. No. 7,616,686, titled "Method and Apparatus for Generating One or More Clock Signals for a Decision-Feedback Equalizer Using DFE Detected Data", by Aziz et al.

U.S. Pat. No. 7,599,461, titled "Method and Apparatus for Generating One or More Clock Signals for a Decision-Feedback Equalizer Using DFE Detected Data in the Presence of an Adverse Pattern", by Aziz et al.

U.S. Patent Publication 2011-0274154, application Ser. No. 12/776,681, titled "A Compensated Phase Detector for Generating One or More Clock Signals Using DFE Detected Data in a Receiver", by Aziz et al.

U.S. patent application Ser. No. 13/288,096, titled "Low Nonlinear Distortion Variable Gain Amplifier", by Aziz et al.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to transfer between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise. Further, elements in a figure having subscripted reference numbers (e.g., $100_1$, $100_2$, ... $100_K$) might be collectively referred to herein using the reference number 100.

The present invention will be described herein in the context of illustrative embodiments of a distortion compensation circuit adapted for use in a serializer/deserializer or the like. It is to be appreciated, however, that the invention is not limited to the specific apparatus and methods illustratively shown and described herein.

As data rates increase for serializer/deserializer (SERDES) applications, the channel quality degrades. Decision feedback equalization (DFE) in conjunction with an optional finite impulse response (FIR) filter in a transmitter (TX) and a receiver equalizer within a receiver is generally used to achieve the bit error rate (BER) performance needed for reliable communications. It is understood that the FIR function of the transmitter can be moved from the transmitter to the receiver and incorporated into the receiver's analog front end (AFE).

FIG. 1 is a block diagram of a typical SERDES communication channel 100 that incorporates a traditional DFE-based equalizer in addition to the TX and RX equalization. As shown in FIG. 1, a transmitter 110 transmits data to a receiver 115 through a channel 120 (such as a backplane) after being equalized or filtered by an optional transmit filter (not shown). After passing through the channel 120, metal traces in a substrate (not shown), a cable (not shown), or a combination thereof, the analog signal is filtered or equalized by an optional receiver analog front end (AFE) 130 that might include a variable gain amplifier (not shown) for amplitude control and, for example, a continuous-time filter. The analog signal output z(t) of the AFE 130 passes through subtractor 140, used in conjunction with a decision feedback equalizer (DFE) 170 having one or more taps and described below, and is then sampled by a clock generator 150. A slicer 160 (described below) digitizes the output w(t) of the subtractor 140 by comparing the sample to an exemplary threshold setting of zero in response to the data clock 162 generated by the clock generator 150 and latches the result, v(k).

The phase of the analog waveform is typically unknown and there may be a frequency offset between the frequency at which the original data was transmitted and the nominal receiver sampling clock frequency. The function of the clock generator 150 is to properly sample the analog waveform such that when the sampled waveform is passed through a slicer, the data is recovered properly despite the fact that the phase and frequency of the transmitted signal is not known. The clock generator 150 is described in more detail below but, for purposes here, is an adaptive feedback circuit where a feedback loop adjusts the phase of a nominal master clock signal to produce a data clock 162 that the slicer 160 uses to sample the analog waveform w(t) to allow proper data detection.

Exemplary operation of the DFE 170 in FIG. 1 is well known and explanation of the filter 170 and alternative embodiments thereof may be found in the above-referenced patent application by Aziz et al, titled "A Compensated Phase Detector for Generating One or More Clock Signals Using DFE Detected Data in a Receiver". For purposes here, a DFE correction, Θ(t), is generated by a DFE filter 170 and is subtracted by an analog subtractor 140 from the output, z(t) of the AFE 130 to produce a DFE corrected signal w(t), where w(t)=z(t)−Θ(t). Then the DFE-corrected signal w(t) is detected or sliced by the slicer 160 to produce the recovered data bits v(k). A conventional error detector (not shown), responsive to the analog signal w(t) and the recovered data bits v(k), in the DFE 170 governs the adaptive operation of the taps in the DFE 170 and is well known in the art.

Figure 2:
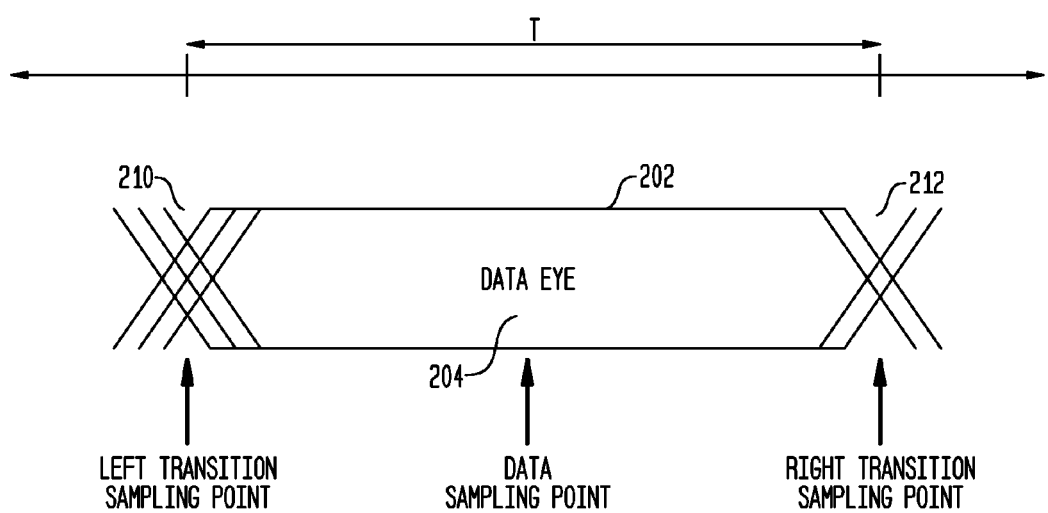
FIG. 2 is a simplified illustration of a data signal having transitions and a data eye.

The slicer 160 is conventional and can be implemented as a slicer-latch (i.e. a decision device based on an amplitude threshold and a latch to hold the results of the decision device) or a more complicated detector such as a sequence detector. For high-speed applications, the slicer 160 is often implemented as a slicer-latch that is clocked by a data sampling clock 162, generated by the clock generator 150, having a phase that allows the slicer 160 to sample the DFE-corrected signal w(t) in the middle (or otherwise substantially optimal point) of the data "eye" as illustrated in FIG. 2. In addition to sampling the data signal, the slicer 160 essentially quantizes the signal to a binary "1" or "−1" based on the sampled analog value and a slicer threshold setting, $s_d$. If the input to the slicer 160 at time k is y(k), then the recovered data bit output, v(k) of the slicer 160 is given as follows:

$$v(k) = +1 \text{ if } y(k) > s_d$$
$$= -1 \text{ otherwise.}$$

In this embodiment and when receiving data, the slicer 160 has a slicer threshold setting $s_d$ of zero. In other embodiments, the binary representations of the quantized signal could be reversed, the slicer threshold setting $s_d$ could be nonzero, or the output bits have values of "1" and "0".

FIG. 2 illustrates exemplary operation of data sampling and timing recovery of the receiver 115 (FIG. 1) is illustrated. When operating correctly, the slicer 160 (FIG. 1) is clocked or triggered by the data-sampling clock 162 (FIG. 1) so that the slicer 160 samples the data signal 202 in the middle or center of the data eye 204. Generally, this sampling point is the desirable point to make a decision about the value of the data bit transmitted by the transmitter 110 (FIG. 1). However, placing the data sampling point in the middle of the data eye can be problematic. Because transitions 210, 212 in the data signal w(t) are used as reference to generate the data clock 162, those transitions can vary depending upon the polarity of the transition, e.g., from a −1 to it +1 and vice-versa. To address this, the clock generator circuit 150 uses transitions 210, 212 on both sides of the data eye 204 to derive phase information for accurate clock phase recovery. For purposes here, the transitions and data eyes have a nominal period of T.

Returning to FIG. 1, the clock generator 150 is composed of several components, two slicers 152 and 154 that are similar to slicer 160, right and left clock and data recovery circuits 156 and 158, an in-phase to quadrature phase skew calculator and filter circuit 164, master clock 166, and three phase shifters 168, 172, and 174. The slicers 152, 154 are substantially the same as slicer 160 and operate as described above. However, the slicers 152 and 154 have slicer threshold settings of $s_r$ and $s_l$, respectively, of zero. In an alternative embodiment, the thresholds $s_r$, $s_l$, and $s_d$ are adaptively adjusted to compensate for, among other factors, "baseline wander" by the input signal. The right slicer 152 is clocked by right clock 176 and the left slicer 154 is clocked by left clock 178. Output from the slicer 152 is fed to the right CDR 156, and output from the slicer 154 is fed to the left CDR 158 via delay element 187. Both CDRs receive the recovered data bits v(k), the left CDR 158 through a delay element 188. Both delay elements 187, 188 might be implemented as a register clocked by the data sampling clock 162. The details of the CDRs 156, 158 are shown in FIG. 3.

The phase shifters 168, 172, 174 are conventional phase shifters. Each phase shifter receives a master clock signal from master clock 166 and shifts the phase of the master clock signal by an amount determined by the phase shift input value. For shifter 168, the amount of shift is specified by the right phase signal 182; for shifter 172, the amount of shift is specified by the data phase signal 184 from block 164 (described in more detail below); and for shifter 174, the amount of shift is specified by the left phase signal 186.

Figure 3:
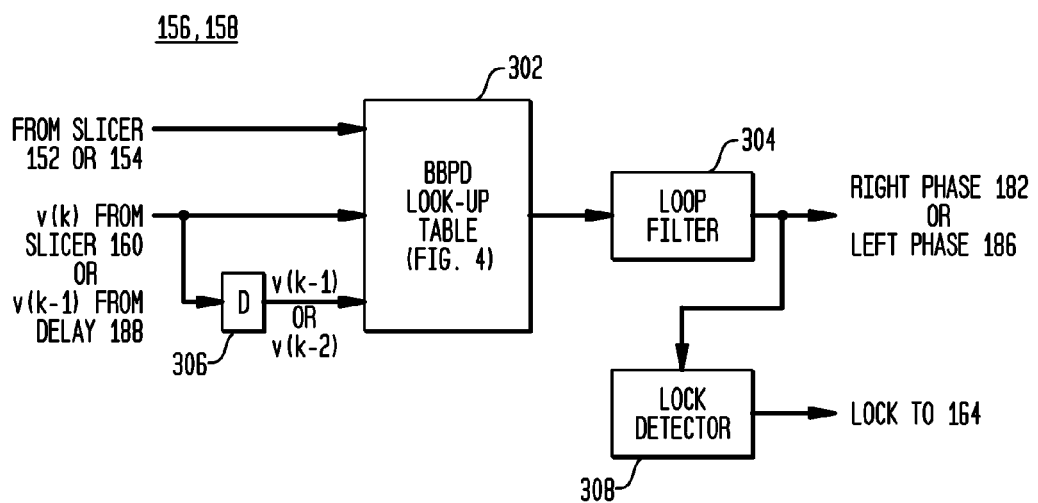
FIG. 3 is a simplified block diagram of clock and data recovery (CDR) circuits in FIG. 1.

As shown in FIG. 3, each CDR 156, 158 has a "bang-bang" phase detector (BBPD) 302, here implemented as a look-up table, and a loop filter 304 embodied as a digital loop filter. The BBPD/lookup table in the right and left CDRs 156, 158 receives the output of the respective slicer 152, 154, representing transition data denoted as v(k−1/2) and v(k−3/2), respectively. For the right CDR 156 the BBPD/lookup table receives the transition data v(k−1/2), the recovered data bits v(k), and a delayed version of the recovered data bits v(k−1) from delay 306, the delay 306 having a delay of one unit interval or bit time T. However the left CDR 158 receives the transition data v(k−3/2), which is the transition data delayed by one unit interval by delay 187, and the recovered data bits delayed by one unit interval from delay 188 so that the recovered data bits applied to the BBPD/lookup table is v(k−1) and v(k−2) instead of v(k) and v(k−1), respectively. Exemplary values in the lookup table characterizing the input/output relationship of the BBPD 302 is shown in FIG. 4. For a general discussion of bang-bang phase detectors, see, for example, J. D. H. Alexander, "Clock Recovery from Random Binary Signals," Electronics Letters, 541-42 (October, 1975), incorporated by reference herein in its entirety. The delay 306 might be implemented as a register clocked by the data sampling clock 162.

The phase detector 302 produces an estimate of timing adjustments needed to properly sample the right or left transition data shown in FIG. 2. The loop filter 304 filters the timing adjustments before the phase of the right and left sampling clocks are adjusted by corresponding phase shifters 168, 174. The value of the phase output from the filter 304 represents the phase of the left or right sample clock with respect to the phase of the clock signal from the master clock 166, measured here in degrees.

A lock detector 308, responsive to the phase output signal from the filter 304, outputs a signal indicating that the CDR is "locked", e.g., if the average of the output phase from the CDR over certain period of time is constant, or within a narrow range of a constant, the CDR is "locked" and the respective "lock" output is asserted. As will be described in more detail below, the lock signals and the right and left phase information from the right CDR 156 and left CDR 158, respectively, is used by the I/Q skew calculator block 164 to compute the data clock phase used by the phase shifter 172 to generate a corrected data clock 162. Also, as explained in more detail below in conjunction with an alternative embodiment of the invention, the lock detector 308 in the left CDR 158 has an enable input coupled to the lock output of the right CDR 156 so that the lock detection for the right and left CDRs is sequential (the right CDR before the left CDR).

As discussed above, the clock generator 150 generates the data sampling clock 162, which is used to sample the recovered data, and two transition sampling clocks, right and left sampling clocks 176, 178, that are offset from the data clock by approximately half a baud-period, T/2, that are used to sample the "transition" data to the right and left of the data eye 204 (FIG. 2). Operation is generally as follows. Assuming that both CDRs 156, 158 are locked, the DFE-corrected analog signal w(t) from the subtractor 140 is sampled and sliced at the baud rate by a slicer 154 using the left (transition) sampling clock 178. Similarly, the DFE-corrected analog signal w(t) from of the subtractor 140 is sampled and sliced at the baud rate by a slicer 152 using the right (transition) sampling clock 176. The left CDR 158, in conjunction with phase shifter 174, phase-aligns the left clock 178 so that the slicer 158 is sampling the DFE corrected signal w(t) at the left transition 210 (FIG. 2). Similarly, the right CDR 156, in conjunction with phase shifter 174, phase-aligns the right clock 168 so that the slicer 152 is sampling the DFE corrected signal w(t) at the right transition 212.

As will be discussed in more detail below in connection with FIGS. 5 and 6, before the clock generator 150 has fully locked onto the received data signal, such as during initial power-up or after input data signal is lost and then reestablished, the clock generator 150 begins by the right CDR 156 locking onto the right transitions 212 before the left CDR 158 locks onto the left transitions 210. To achieve this, the data sampling clock 162 is derived from the right phase 182 until the both the right and left CDRs are locked.

Figure 5:
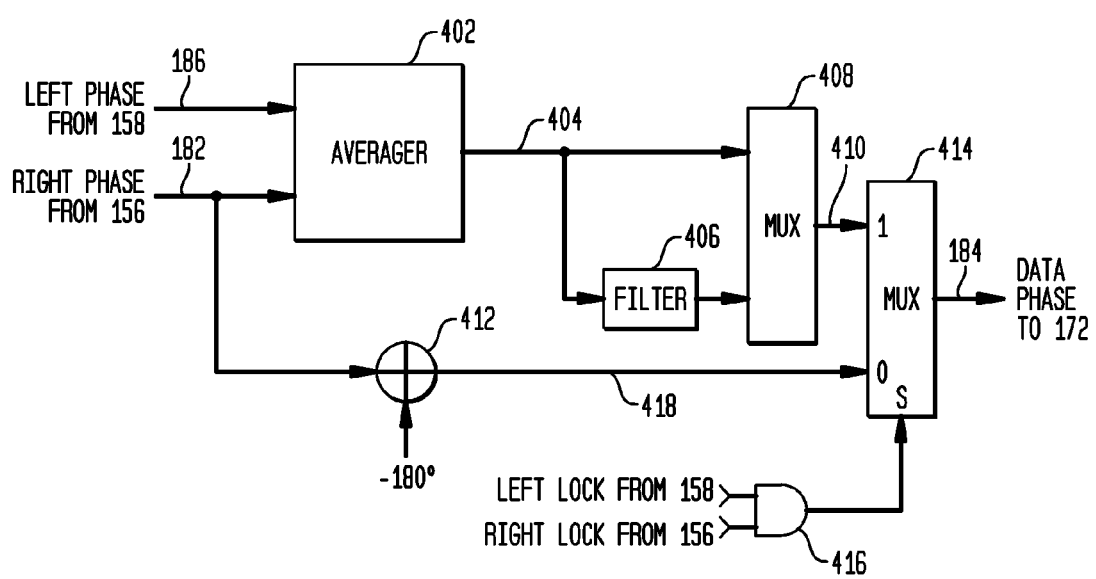
FIG. 5 is a simplified block diagram of the I/Q skew calculation block of FIG. 1.

FIG. 5 illustrates one embodiment of the I/Q skew calculator block 164. An averager 402 receives the right phase 182 from the right CDR 156 and the left phase 186 from the left CDR 158. The averager 402 calculates the average of the two phase values, e.g., (right phase+left phase)/2, or any other suitable method of determining the mid-point between the two phases, and outputs the average 404. In addition, the averager 402 might add or subtract a small phase offset amount to compensate for other sources of phase errors. The average 404 might be then filtered by filter 406 to reduce jitter and noise. A multiplexer 408, under control of a controller (not shown), might be configured to select as output 410 either the filtered or unfiltered average 404 as desired.

As mentioned above, if either the right or left CDR is not in lock, then the data-sampling clock is derived from the right phase values. As shown here, the value of the right phase 186 is offset by −180° by adder (or subtractor) 412 and multiplexer 414 is configured to output the offset right phase value 418 from adder 412 as the data phase 184. This results in the phase of the data sampling clock 162 to be offset by −180° from the right sampling clock 178, i.e., the data-sampling clock is earlier by T/2 with respect to the right sampling clock, so that the data-sampling clock has approximately the correct phase for proper data eye sampling. In an alternative embodiment, the left CDR 158 is configured to lock first, and the left phase value 186 is used instead of the right phase value 182 as input to adder 412 to add 180° to the left phase value 186.

The multiplexer 414 is controlled by exemplary AND gate 416 so that the multiplexer 414 is configured to couple the output of the adder 412 to the output of the multiplexer if either or both lock signals from the CDRs 156, 158 are not being asserted (false). However, if both CDRs are in lock, then the multiplexer 414 is configured to couple, depending on the state of the multiplexer 408, either the phase average 404 or the filtered version thereof from filter 406 to the output of the multiplexer 414 to form the data phase value 184. In an alternative embodiment, there is no gate 416, the output of the lock detector 308 in the left CDR 158 is coupled to the control input of the multiplexer 424, and the lock detector 308 in the left CDR 158 is enabled when the right CDR 156 is in lock. Then when both the right and left CDRs are locked, the multiplexer 414 is configured to couple the phase average 404 (or the filtered version thereof from filter 406) to form the data phase value 184.

One example of the operation of the clock generator 150 is as follows. Assuming the left phase sampling value is 5° ahead of the phase of the master clock 166 and the right phase sampling value is 352° ahead of the phase of the master clock (or, viewed alternatively, 8° behind), the average of the two phase values is 178.5°. Thus it is 178.5°, not 180°, where the data sampling clock should be positioned with respect to the master clock for properly sampling the middle of the data eye 204 (FIG. 2).

Figure 6:
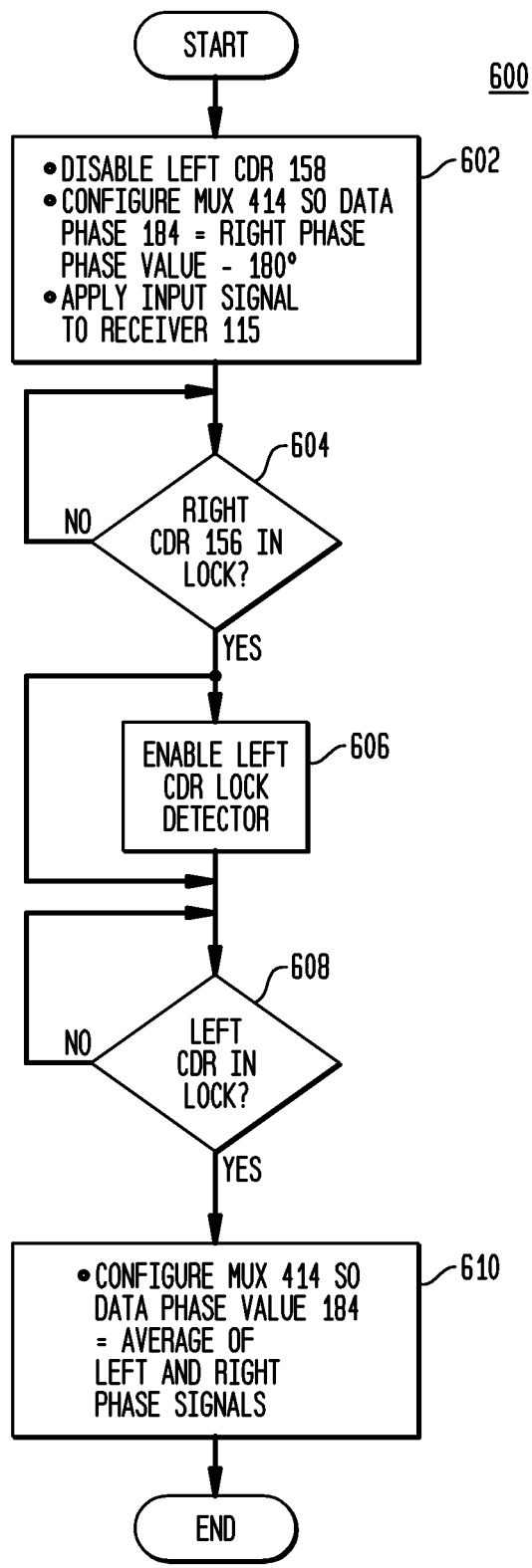
FIG. 6 a simplified flow diagram illustrating an exemplary operation of the receiver in FIG. 1.

An exemplary initialization and operation of the clock generator 150 is illustrated by the flow chart in FIG. 6. The process 600 when begins in step 602 where the left CDR 158 is disabled because the right CDR 156 is not yet locked, the multiplexer 414 is configured to set the data phase value 184 to the offset right phase value 418 and, optionally a training sequence (having a known sequence of data bits with many transitions for rapid CDR locking and DFE/AFE adaptation but might be an actual data) or the like is received by the receiver 115 from the transmitter 110. In step 604, once the right CDR 156 is locked, control passes either directly to step 608 or, in an alternative embodiment, to step 606 to enable the lock detector 308 in the left CDR 158 and then control passes to step 608. Once the left CDR 158 is in lock in step 608, then control passes to step 610 where multiplexer 414 is reconfigured so that the average of the left and right phase values 404 (or the filtered version thereof) is the data phase value 184.

The circuit functions in the clock generator 150 described herein might be implemented in purely digital form or may be a hybrid of analog and digital techniques, e.g., the CDRs 156, 158, I/Q skew block 164 are implemented in digital form while the slicers and phase shifters 168, 172, 174 are analog or a digital/analog hybrid.

It is further understood that the exemplary clock recovery circuit arrangement described above is useful in applications other than in SERDES receivers, e.g., communications transmitters and receivers generally.

While embodiments have been described with respect to circuit functions, the embodiments of the present invention are not so limited. Possible implementations, either as a stand-alone SERDES or as a SERDES embedded with other circuit functions, may be embodied in or part of a single integrated circuit, a multi-chip module, a single card, system-on-a-chip, or a multi-card circuit pack, etc. but are not limited thereto. As would be apparent to one skilled in the art, the various embodiments might also be implemented as part of a larger system. Such embodiments might be employed in conjunction with, for example, a digital signal processor, microcontroller, field-programmable gate array, application-specific integrated circuit, or general-purpose computer. It is understood that embodiments of the invention are not limited to the described embodiments, and that various other embodiments within the scope of the following claims will be apparent to those skilled in the art.

It is understood that various changes in the details, materials, and arrangements of the parts which have been described and illustrated in order to explain the nature of this invention may be made by those skilled in the art without departing from the scope of the invention as expressed in the following claims.

The invention claimed is:

1. A receiver having:
a data slicer having an output, a signal input coupled to an input of the receiver, and a clock input; and
a clock generator coupled to the input of the receiver;
wherein the clock generator comprises:
a first slicer having an output, a signal input coupled to the input of the receiver, and a clock input;
a second slicer having an output, a signal input coupled to the input of the receiver, and a clock input;
a first clock and data recovery circuit coupled to the output of the first slicer and configured to generate a first phase value at an output;
a second clock and data recovery circuit coupled to the output of the second slicer and configured to generate a second phase value at an output;
a phase averaging circuit configured to compute an average of the first phase value and the second phase value and generate an average phase value at an output;
a first phase shifter configured to generate a first transition sampling clock having a phase determined by the first phase value;
a second phase shifter configured to generate a second transition sampling clock having a phase determined by the second phase value;
a third phase shifter configured to generate a data sampling clock having a phase determined by the average phase value;
wherein the clock input of the data slicer is adapted to receive the data sampling clock, the clock input of the first slicer is adapted to receive the first transition sampling clock, and the clock input of the second slicer is adapted to receive the second transition sampling clock.

2. The receiver of claim 1 further comprising:
a master clock for generating a master clock signal;
wherein each of the phase shifters receives the master clock signal and the sampling clock signal output from each of the phase shifters is the master clock signal phase shifted by the amount specified by the respective phase values.

3. The receiver of claim 1 further comprising:
a first multiplexer having a first input coupled to the output of the phase averaging circuit, a second input, and an output coupled to the of the third phase shifter;
an adder having one input coupled to the output of the first clock and data recovery circuit, a second input, and an output coupled to the second input of the first multiplexer;
wherein the second input of the adder is configured to receive a value representing a phase shift of approximately 180°, the output of the adder being the first phase value offset by approximately 180°.

4. The receiver of claim 3 wherein each of the clock and data recovery circuits has a lock output for indicating that the corresponding clock and data recovery circuit is phase-locked onto data transition in input signals applied to the receiver, the first multiplexer has a control input coupled to the lock outputs of the clock and data recovery circuits, and the phase of the data sampling clock from the third phase shifter is determined by either i) the average phase value when both clock and data recovery circuits are in phase-lock, or ii) the offset first phase value from the adder if either clock and data recovery circuit is not in phase-lock.

5. The receiver of claim 3 wherein the second clock and data recovery circuit has an enable input coupled to the lock output of the first clock and data recovery circuit such that the second clock and data recovery circuit does not assert a signal indicating that it is phase-locked until the first clock and data recovery circuit is phase-locked.

6. The receiver of claim 5 wherein the first clock and data recovery circuit is adapted to lock onto transitions temporally before the data eye and the second clock and data recovery circuit is adapted to lock onto transitions temporally after the data eye.

7. The receiver of claim 3 wherein the first clock and data recovery circuit has an enable input coupled to the lock output of the second clock and data recovery circuit such that the first clock and data recovery circuit does not assert a signal indicating that it is phase-locked until the second clock and data recovery circuit is phase-locked.

8. The receiver of claim 3 further comprising:
a filter coupled to the output of the phase averaging circuit; and
a second multiplexer having one input coupled to the output of the phase averaging circuit, a second input coupled to an output of the filter, and an output coupled to the first input of the first multiplexer.

9. The receiver of claim 1 wherein the first, second, and data slicers have slicing thresholds of approximately zero.

10. The receiver of claim 1 further comprising:
a summer having an output and a first input, the first input coupled to the input of the receiver;
a decision feedback equalizer having one input coupled to the output of the summer, another input coupled to the output of the data slicer, and having an output coupled to a second input of the summer;
wherein the signal inputs of the first, second, and data slicers are coupled to the output of the summer.

11. The receiver of claim 1 wherein each of the first and second clock and data recovery circuits comprise:
a hang-bang phase detector having an output, a first input coupled to the corresponding first or second slicer, a second input coupled to the output of the data slicer, and a third input;
a first delay unit coupled between the output of the data slicer and the third input of the bang-bang phase detector; and
a loop filter disposed between the output of the phase detector and the output of the clock and data recovery circuit;
wherein the delay unit has a delay of one data symbol time.

12. The receiver of claim 11 wherein the second clock and data recovery circuit further comprises:
a second delay unit coupled between the data slicer and the second input of the bang-bang phase detector and between the data slicer and the first delay unit; and
a third delay unit coupled between the second slicer and the first input of the bang-bang phase detector.

13. The receiver of claim 1 wherein the receiver is implemented in an integrated circuit.

14. A method of generating clock signals in a receiver comprising the steps of:
generating, using a first clock and data recovery circuit, a first clock signal phase-aligned with transitions temporally after a data eye in data signals applied to an input of the receiver;
generating, by the first clock and data recovery circuit, a first phase value indicating a phase difference between the first clock signal and a reference clock signal;
generating, using a second clock and data recovery circuit, a second clock signal phase-aligned with transitions temporally before the data eye in the data signals;
generating, by the second clock and data recovery circuit, a second phase value indicating a phase difference between the second clock signal and the reference clock signal;
calculating an average of the first phase value and the second phase value to form an average phase value;
generating a data sampling clock signal phase shifted from the reference clock signal by an amount determined by the average phase value; and
slicing the data signals using a slicer clocked by the data sampling clock.

15. The method of claim 14 further comprising the steps of:
generating a lock signal when the first clock and data recovery circuit is phase-locked onto data input signals;
generating a phase-shifted first phase value of the first phase value phase shifted by approximately 180 degrees;
substituting, when either or both of the clock and data recovery circuits is not phase-locked, the phase-shifted first phase value for the average phase value in the step of generating the data sampling clock.

16. The method of claim 14 wherein the step of calculating an average of the first phase value and the second phase value to form an average phase value comprises the steps of:
summing the first and second phase values to form a phase sum value; and
dividing the phase sum value by two to produce the average phase value.

17. The method of claim 16 further comprising the steps of:
generating a lock signal when the second clock and data recovery circuit is phase-locked onto data input signals;
generating a phase-shifted second phase value of the second phase value phase shifted by approximately 180 degrees;
substituting, when either or both of the clock and data recovery circuits is not phase-locked, the phase-shifted second phase value for the average phase value in the step of generating the data sampling dock.

18. The method of claim 16 wherein the average phase value has added thereto a phase offset constant.

19. A receiver having:
a data slicer having an output, a signal input coupled to an input of the receiver, and a clock input; and
a clock generator coupled to the input of the receiver;
wherein the clock generator comprises:
a first slicer having an output, a signal input coupled to the input of the receiver, and a clock input;
a second slicer having an output, a signal input coupled to the input of the receiver, and a clock input;
a first clock and data recovery circuit coupled to the output of the first slicer and configured to generate a first phase value at an output and having a lock output for indicating that the first clock and data recovery circuit is phase-locked onto data transitions in input signals applied to the receiver;
a second clock and data recovery circuit coupled to the output of the second slicer configured to generate a second phase value at an output and having a lock output for indicating that the second clock and data recovery circuit is phase-locked onto data transitions in input signals applied to the receiver;
a phase averaging circuit configured to compute an average of the first phase value and the second phase value and generate an average phase value at an output;
a multiplexer having a control input coupled to the lock outputs of the first and second clock and data recovery circuits, a first input coupled to the output of the phase averaging circuit, a second input, and an output coupled to the of the third phase shifter;
an adder having one input coupled to the output of the first clock and data recovery circuit, a second input configured to receive a value representing a phase shift of approximately 180°, and an output coupled to the second input of the multiplexer;
a master clock configured to generate a master clock signal;
a first phase shifter configured to receive the master clock signal and generate a first transition sampling clock from the master clock signal and phase shifted therefrom determined by the first phase value;
a second phase shifter configured to receive the master clock signal and generate a second transition sampling clock from the master clock signal and phase shifted therefrom determined by the second phase value;
a third phase shifter configured to receive the master clock signal and generate a data sampling clock from the master clock signal and phase shifted therefrom determined by the average phase value;
wherein the clock input of the data slicer is adapted to receive the data sampling clock, and the first clock and data recovery circuit is adapted to lock onto transitions temporally before the data eye and the second clock and data recovery circuit is adapted to lock onto transitions temporally after the data eye, and the phase of the data sampling clock from the third phase shifter is determined by either i) the average phase value when both clock and data recovery circuits are in phase-lock, or ii) the offset first phase value from the adder if either clock and data recovery circuit is not in phase-lock.

20. The receiver of claim 19 further comprising:
a filter coupled to the output of the phase averaging circuit; and
an additional multiplexer having one input coupled to the output of the phase averaging circuit, a second input coupled to an output of the filter, and an output coupled to the first input of the first multiplexer.

* * * * *